(12) United States Patent
Roche et al.

(10) Patent No.: US 7,450,780 B2
(45) Date of Patent: Nov. 11, 2008

(54) SIMILARITY MEASURES

(75) Inventors: Alexis Roche, Orsay (FR); Michael Brady, Oxford (GB); Jérôme Marie Joseph Declerck, Oxford (GB); Olivier Corolleur, Combs-la-Ville (FR)

(73) Assignee: Siemens Medical Solutions, USA, Inc., Malvern, PA (US)

( * ) Notice: Subject to any disclaimer, the term of this patent is extended or adjusted under 35 U.S.C. 154(b) by 721 days.

(21) Appl. No.: 10/935,045

(22) Filed: Sep. 7, 2004

(65) Prior Publication Data

US 2005/0152617 A1   Jul. 14, 2005

(30) Foreign Application Priority Data

Sep. 8, 2003  (GB)  ................................. 0320973.1

(51) Int. Cl.
 *G06K 9/36* (2006.01)
(52) U.S. Cl. ..................... 382/276; 382/128
(58) Field of Classification Search .............. 382/294, 382/276
See application file for complete search history.

(56) References Cited

U.S. PATENT DOCUMENTS

| | | | |
|---|---|---|---|
| 6,173,240 B1 * | 1/2001 | Sepulveda et al. | 703/2 |
| 6,266,453 B1 * | 7/2001 | Hibbard et al. | 382/294 |
| 6,539,127 B1 * | 3/2003 | Roche et al. | 382/294 |
| 6,728,424 B1 * | 4/2004 | Zhu et al. | 382/294 |
| 6,775,405 B1 * | 8/2004 | Zhu | 382/154 |
| 7,263,243 B2 * | 8/2007 | Chen et al. | 382/294 |
| 2005/0147325 A1 * | 7/2005 | Chen et al. | 382/294 |
| 2005/0152617 A1 * | 7/2005 | Roche et al. | 382/294 |
| 2006/0029291 A1 * | 2/2006 | Sun et al. | 382/294 |
| 2006/0133694 A1 * | 6/2006 | Dewaele | 382/294 |
| 2007/0081712 A1 * | 4/2007 | Huang et al. | 382/128 |
| 2007/0172105 A1 * | 7/2007 | Bahlmann et al. | 382/131 |
| 2008/0080770 A1 * | 4/2008 | Mendonca et al. | 382/180 |

FOREIGN PATENT DOCUMENTS

| | | |
|---|---|---|
| EP | 0977148 A1 | 2/2000 |
| WO | 02/27660 A3 | 4/2002 |

OTHER PUBLICATIONS

R. Bansal, L. H. Staib, Z. Chen, A. Rangarajan, J. Knisely, R. Nath, and J. S. Duncan. A Novel Approach for the Registration of 2D Portal and 3D CT Images for Treatment Setup Verification in Radiotherapy. In First International Conference on Medical Image Computing And Computer-Assisted Intervention (MICCAI'98), vol. 1496 of Lecture Notes in Computer Science, pp,. 1075-1086, Cambridge, MA, USA, Oct. 1998. Springer Verlag.

(Continued)

*Primary Examiner*—Matthew C. Bella
*Assistant Examiner*—Sath V. Perungavoor
(74) *Attorney, Agent, or Firm*—Kalow & Springut LLP

(57) ABSTRACT

A method of matching data sets, such as different images, by estimating a transformation which relates the two images. Different candidate transformations are scored by using a similarity measure calculated on the basis of probability density functions derived from the two data sets themselves. The probability density functions are based on local likelihood density estimation (LLDE). The technique is applicable to image registration, and also to data fusion.

13 Claims, 4 Drawing Sheets

OTHER PUBLICATIONS

L.G. Brown. A Survey of Image Registration Techniques. ACM Computing Surveys, 24(4):32-376, 1992.

A. Collignon, F. Maes, D. Delaere, D. Vandermeulen,. P. Suetens, and G. Marchal. Automated multi-modality image registration based on information theory. In Y. Bizais and C. Barillot, editors, Proc, XIVth international conference on information processing in medical imaging (IPMI'95), pp. 263-274. Kluwer Academic Publishers, Jun. 1995.

C. Couvreur, The EM Algorithm: A Guided Tour. In. Proc. 2d IEEE European Workshop on Computationaly Intensive Methods in Control and Signal Processing, Prague, Czech Republic, Aug. 1996.

C. R. Loader. Local likelihood density estimation. Annals of Statistics, 24(4): 1602-1618, 1996.

J. B. A. Maintz and M. A. Viergever. A survey of medical image registration. Medical Image Analysis, 2(1):1-36, 1998.

G. P. Penney, J. Weese, J. A. Little, P. Desmedt, D. L. G. Hill, and D. J. Hawkes. A Comparison of Similarity Measures for Use in 2D-3D Medical Image Registration. In First International Conference on Medical Image Computing And Computer-Assisted Intervention (MICCAI'98), vol. 1496 of Lecture Notes in Computer Science, pp. 1153-1161, Cambridge, MA, USA, Oct. 1998. Springer Verlag.

A. Roche, G. Malandain, X. Pennec, and N. Ayache. The Correlation Ratio as a New Similarity Measure for Multimodal Image Registration, In First International Conference on Medical Robotics, Imaging And Computer Assisted Surgery (1VIICCAI'98), vol. 1496 of Lecture. Notes in Computer Science, pp. 1115-1124, Cambridge, MA, USA, Oct. 1998. Springer Verlag.

D. Sarrut and S. Miguet. Similarity Measures for Image Registration. In European Workshop on Content-Based Multimedia Indexing, pp. 263-270, Toulouse, France, Oct. 1999. IHMPTIRIT.

C. Studholme, D. L. G. Hill, and D. J. Hawkes. An overlap invariant entropy measure of 3D medical image alignment, Pattern Recognition, 32 (1):71-86, 1998.

P. Viola. Alignment by Maximization of Mutual Information. PhD thesis, Massachusetts Institute of Technology, 1995. (Ch. IV).

British Patent Office Search Report Feb. 2004.

* cited by examiner

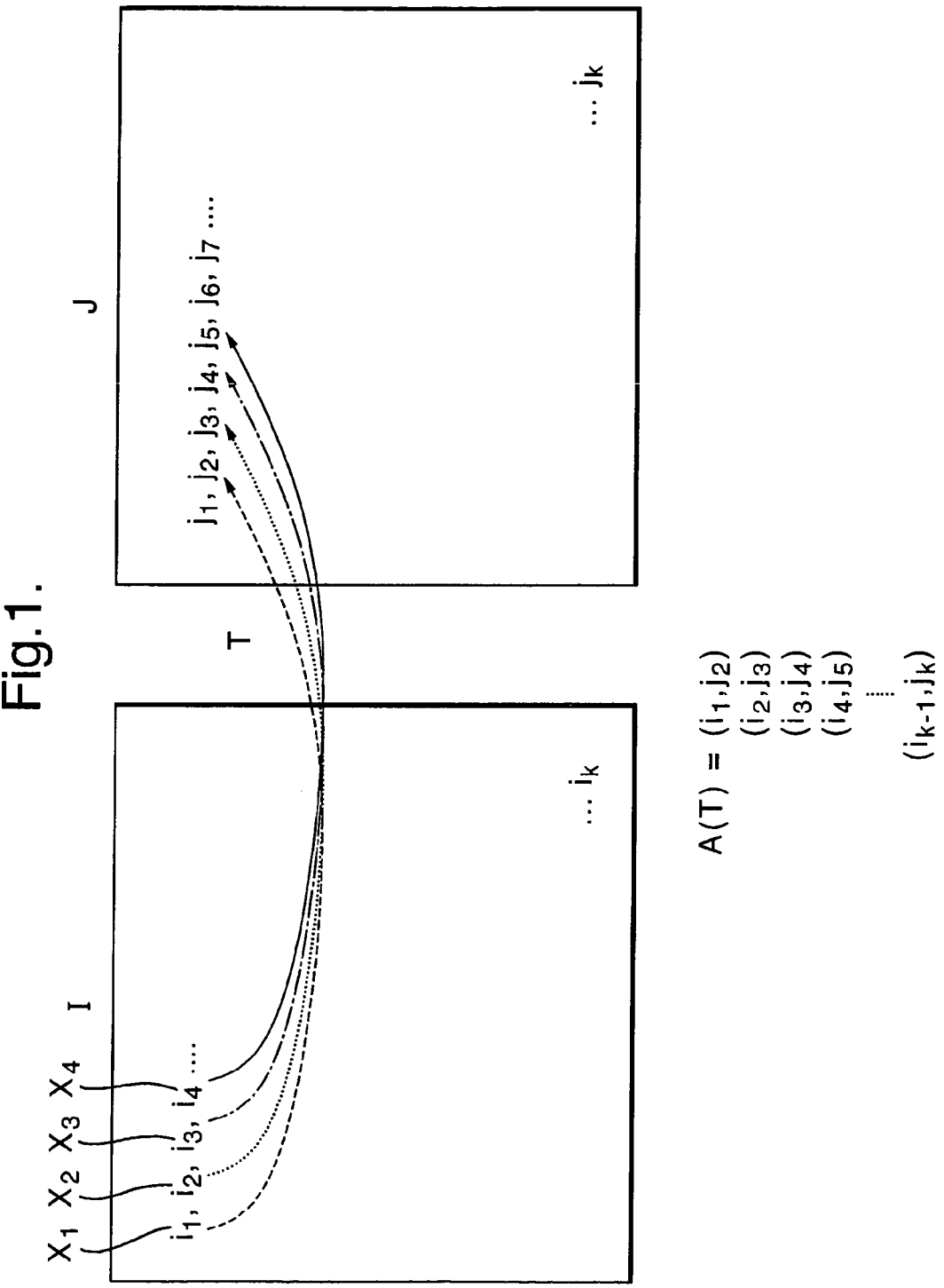

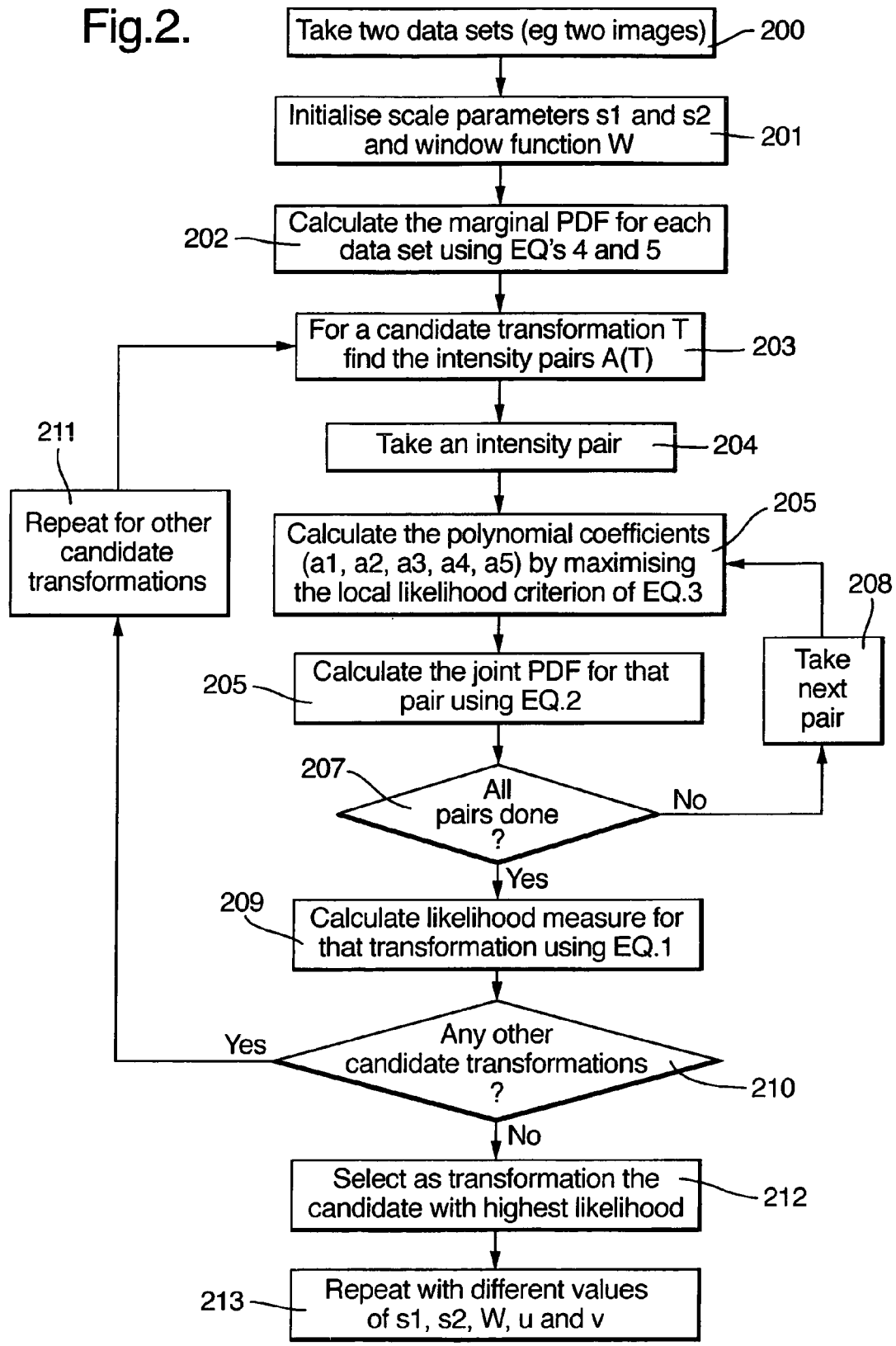

Original joint histogram

Smoothed joint histogram

Estimated $p(i,j)$ with $s_1=2$, $s_2=2$

Estimated $p(i,j)$ with $s_1=4$, $s_2=4$

Fig.4(c) The fused image
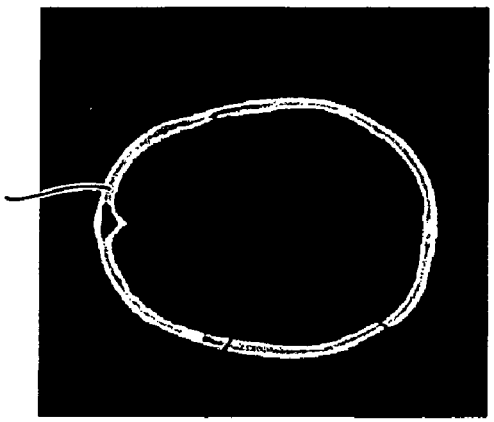
Fig.4(b) A slice of the CT image
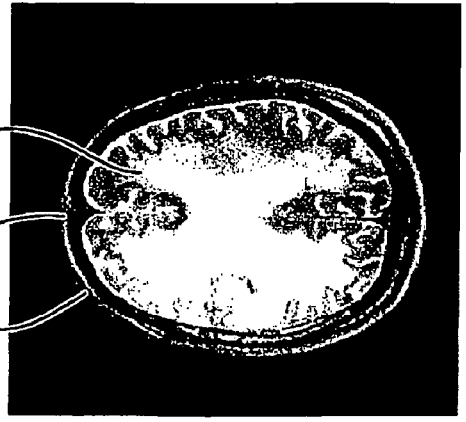
Fig.4(a) A slice of the MR image

SIMILARITY MEASURES

BACKGROUND OF THE INVENTION

The present invention relates to similarity measures used for measuring the degree of match of data sets to each other.

There are many fields in which it is desirable to be able to measure the similarity or degree of match of one data set to another. For example, there are many situations in which two images are compared to determine a spatial transformation which relates the two images. For example, one method of compressing a time sequence of images is to detect movement vectors which describe where image features found in a first frame are positioned in a second frame. Alternatively, in the field of medical imaging, it is often desirable to display two images of the same object (for example, part of a patient's body) overlying one another. The two images could be images taken at different times or images taken with different modalities. The display of the two images overlying one another requires them to be registered and this involves finding the position of corresponding image features in each of the images. Similar techniques are useful in other fields involving so-called data fusion, for example in which a visible or infrared image is registered with a different kind of image, such as synthetic aperture radar. The need may also arise with one-dimensional signals such as ECG and blood-oxygen level which could usefully be registered, and four-dimensional images such as contrast-enhanced MRI in which a 3-D image varies over time.

DISCUSSION OF THE PRIOR ART

In registering data sets in this way, typically a variety of candidate transformations are applied to the images and are scored on the basis of how accurately they register the two images. The score may be calculated automatically using a similarity measure and a large number of different similarity measures have been proposed, for example least square differences, cross-correlation etc, the different similarity measures being, in general, suited to different types of data sets.

Until now, similarity measures have tended to be selected either on a trial-and-error basis for the particular data sets to be matched, or have been derived from an understanding of the mechanisms underlying the generation of the data, for example the physical processes behind the generation of the images. However, it can be difficult to predict whether a given similarity measure will be suitable for a particular type of data, and the designing of new similarity measures is a time-consuming and difficult process.

SUMMARY OF THE INVENTION

In accordance with the present invention the designing of a similarity measure, which measures the likelihood that a given transformation is the correct one, takes place in a statistical framework based on the properties of the two data sets themselves, using the methodology of maximum likelihood inference.

In more detail, the present invention provides a method of finding a transformation which relates data points in a first data set to data points in a second data set, comprising calculating for each of a plurality of candidate transformations a likelihood measure representing the likelihood that the candidate transformation correctly represents the relationship between the two data sets, the likelihood measure being based on local parametric joint and marginal probability density functions (pdf) calculated for the pairs of data points in the two data sets which are regarded as corresponding under the candidate transformation, the parameters of the functions being set by maximising a local likelihood criterion for the pairs of data points.

Preferably the probability density functions are based on the characteristics of the data points local to the pairs of data points. Thus the parametric functions, which may differ from point to point, are assumed to hold for the neighbourhood of the data points, but may differ for points distant from each other.

Thus, with the present invention the probability density functions are calculated for the pairs of data points generated by the particular candidate transformation under consideration. The likelihood measure is therefore adapted to the two data sets being matched. There is no need for prior knowledge of the mechanism of production of the data sets.

The probability density functions may be simple parametric functions, such as second order polynomial functions. The parameters of the functions are set by maximising the local likelihood criterion for pairs of data points, this being based on the probability density function and preferably a window function and a scale parameter. The window function and scale parameter may be heuristically adjusted to tune the performance of the method. The parameters may be recalculated for each pair of data points, or at least for different parts of the image.

The method is applicable to the registration of images in which the data sets are, for example, the intensities of the pixels, and in this case the transformation is a spatial transformation which registers the two images. The images may, for example be different modality and/or time-spaced images and the method is particularly suitable to the registration of medical images.

However, the method is applicable to other data sets, such as those representing signals or measurements.

It will be appreciated that the invention may be embodied in computer software and thus may provide a computer program for executing the method on a suitably programmed computer system. Alternatively, of course, the invention may be embodied in firmware or dedicated hardware.

BRIEF DESCRIPTION OF THE DRAWINGS

The invention will be further described by way of example with reference to the accompanying drawings in which:

FIG. 1 schematically illustrates two data sets which may be processed in accordance with the invention;

FIG. 2 is a flow diagram of one example of the invention;

FIGS. 4(a), (b) and (c) show respectively example slices of an MR and CT image and the result of fusing them using the technique of the invention.

DESCRIPTION OF A PREFERRED EMBODIMENT

Figure 3A:
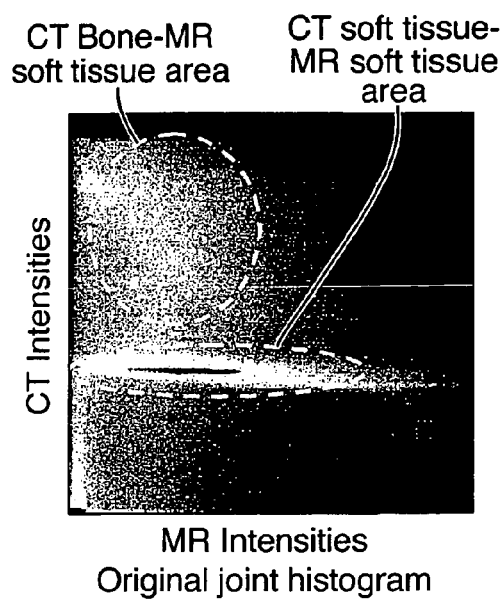
FIGS. 3(a) and (b) show the joint and smoothed histogram of a CT-MR pair of images of the brain and FIGS. 3(c) and (d) corresponding estimated pdfs using the technique of the invention.

An embodiment of the invention will be described with reference to two data sets which are images. Thus, as illustrated in FIG. 1, given two images I and J, and that J is a version of I transformed by transformation T which purports to relate their respective coordinate systems, the aim is to develop a similarity measure which accurately scores how close the transformation T is to the "correct" transformation. In other words, how likely is it that J is image I transformed by transformation T? The transformation T defines a set of spatial correspondences between the pixels from I and the pixels from J.

Assuming that I is the source image and J is the target image, this means that a pixel with coordinates x in the coordinate system in image I matches the pixel with coordinates T(x) in the coordinate system of image J. Let us denote by $\{x_k\}$, with k=1, ..., n, the set of pixels of image I. The intensity value corresponding to $x_k$ will be denoted $i_k$. Similarly, the intensity value of its corresponding pixel in J, i.e. the pixel with coordinates $T(x_k)$, will be denoted $j_k$.

Note that, proceeding in this way from a given transformation T yields a set of intensity pairs, $A(T)=\{(i_k, j_k), k=1, \ldots, n\}$. Note also that the set of intensity pairs would be expected to change as the putative transformation T changes, that is, the set of intensity pairs can be regarded mathematically as a function of T. The likelihood of T, i.e. the probability that T is the correct registration transformation, is given by the following formula:

$$l(T) = \sum_{k \in A(T)} \log \frac{p(i_k, j_k)}{p_1(i_k)p_2(j_k)} \quad (1)$$

where p is the joint intensity pdf, while $p_1$ and $p_2$ are the marginal pdfs corresponding respectively to I and J. However, equation (1) can be exploited in practice only if these three pdfs are specified.

The basic principle used in the present embodiment is to use Local Likelihood Density Estimation (LLDE) to estimate the pdf from a data set by assuming that the pdf locally can be approximated by a simple parametric form, even when, as is the case in general, there is no simple parametric form for the entire pdf. In this embodiment, it is further assumed that the logarithm of the pdf is locally a second-order polynomial, but it can be understood that any other parametric form could be used, e.g. a higher-order polynomial.

Thus, for any observed intensity pair (i,j), a set of coefficients $(a_0, a_1, \ldots, a_5)$ is calculated such that the polynomial approximation to the pdf holds in a neighbourhood of (i,j):

$$\log p(u,v) \approx a_0 + a_1(u-i) + a_2(v-j) + a_3(u-i)(v-j) + a_4(u-i)^2 + a_5(v-j)^2, \quad (2)$$

for u and v sufficiently close to i and j, respectively. In one embodiment of the method, polynomial coefficients are set so as to maximise the local likelihood criterion:

$$C(a_0, a_1, \ldots, a_5) = \sum_k w\left(\frac{i_k-i}{s_1}, \frac{j_k-j}{s_2}\right)\log p(i_k, j_k) - n\int w\left(\frac{u-i}{s_1}, \frac{v-j}{s_2}\right)p(u,v)dudv \quad (3)$$

where w(.,.) is a given window function and $s_1$ $s_2$ are scale parameters. Typical choices for w are: 1) the box car function, i.e. w(x,y)=1 if /x/<1 and /y/<1, and w(x,y)=0 otherwise, and 2) the Gaussian function, i.e. $w(x,y)=\exp(-x^2-y^2)$. While w determines the shape of the local weighting function, the scale parameters $s_1$ and $s_2$ adjust the extension of the neighbourhood defined by the window support, and therefore control the size of locality. Both s1 and s2 are parameters of the method, and the method of tuning those parameters is completely independent from the present invention. In an empirically based implementation, s1 and s2 may be set, depending on the specific image types being considered, to values that were evidenced to yield good registration results in previous experiments with similar images. For instance, an example rule that proved to be useful in practice is to set s1 to a given fraction of the maximum intensity in image I, the fraction being 1% for a CT image, 2% for an MR image, and 5% for a PET or SPECT image. The same rule may be applied to s2 depending on the type of image J.

From a theoretical standpoint, the bigger s1 and s2 the bigger the intensity neighbourhood used to fit the local polynomial model, and, therefore, the smoother the resulting pdf estimate. On the other hand, choosing small values for s1 and s2 yields more flexibility as it allows for more abrupt variations in the pdf estimate; however, the price to pay is that registration tends to be more sensitive to image artifacts and noise. This familiar trading off scale parameters is common in statistical estimation, where it is known as "bandwidth selection".

The estimation of the marginal pdfs, $p_1$ and $p_2$, follows from the same principle. A local second-order polynomial form is assumed, i.e.:

$$\log p_1(u) \approx a_0 + a_1(u-i) + a_2(u-i)^2 \quad (4)$$

and similarly for $p_2$.

The local polynomial is fitted by maximising a one-dimensional version of Equation (3):

$$C(a_0, a_1, a_3) = \sum_k w_1\left(\frac{i_k-i}{s_1}\right)\log p_1(i_k) - n\int w_1\left(\frac{u-i}{s_1}\right)p_1(u)du \quad (5)$$

and similarly for $p_2$. For consistency with the joint pdf estimation, the window functions $w_1$ and $w_2$ are defined from the bidimensional window function w as: $w_1(u)=w(u,0)$ and $w_2(v)=w(0,v)$.

The main advantage of LLDE lies in its ability to provide accurate density estimates while resorting to very few assumptions regarding the shape of the pdf. This is important because mispecification of the densities p, $p_1$ and $p_2$ involved in the similarity measure (1) may be reflected by substantial registration errors.

Unlike parametric approaches, a global model of the joint pdf, is not needed, the selection of which would require the tedious and difficult task of modelling the image acquisition processes. Moreover, parametric approaches typically lead to non-convex optimisation problems which make them difficult to implement in practice.

FIG. 2 is a flow diagram which indicates the steps in the order they can occur in an example algorithm. The two data sets are taken in step 200, for example the two images, and then in step 201 it is necessary to choose scale parameters $s_1$ and $s_2$ and the window function w as discussed above.

In step 202 the marginal pdfs for each of the data sets are calculated using Equations 4 and 5, that is to say calculating $a_0$ $a_1$ $a_2$ by fitting the local polynomial of Equation 4 by maximising Equation 5. (This step can be carried out at any time before the likelihood calculation for which it is needed.)

Then, in step 203, for a given candidate transformation T, the intensity pairs A(T) are found. Referring to FIG. 1, the transformation T illustrated there is a simple shift to the right by one pixel. Thus, under the transformation T, pixel j2 corresponds to pixel i1, pixel j3 corresponds to pixel i2 etc. Thus the set of intensity pairs A(T) is as illustrated below the two image frames.

Then in step 204 an intensity pair is taken and the polynomial coefficients $a_1, a_2, a_3, a_4, a_5$ are calculated in step 205 by maximising the local likelihood criterion of equation (3). (Note that the coefficients $a_1, a_2, a_3, a_4, a_5$ vary from pair to pair.)

Having obtained the polynomial coefficients the joint probability density function p can be calculated in step 206 using the equation (2).

In step 207 it is tested whether all intensity pairs have been treated and if not the process is repeated until all pairs have been done. Once all pairs have been done the likelihood measure for that transformation can be calculated in step 209 using equation (1).

Then in step 210 and 211, other candidate transformations are taken and the process is repeated.

Each candidate transformation will then have an associated likelihood and in step 212 it is possible to select the transformation with the highest likelihood. This represents the best estimate of how the second image frame relates to the first. As indicated in step 213, it is possible to repeat the process with different values of $s_1$, $s_2$ and w to improve the results.

Figure 3B:
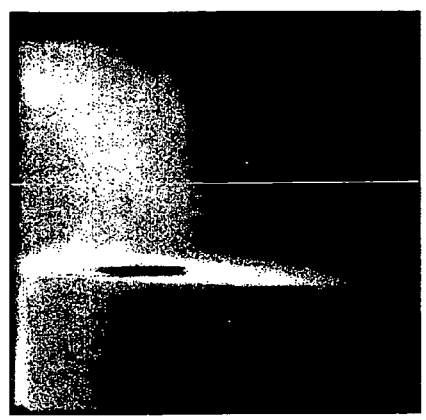
Figure 3C:
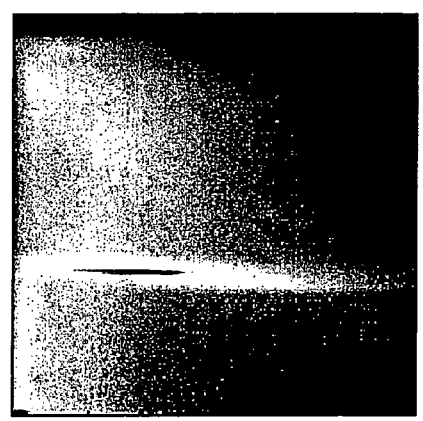
Figure 3D:
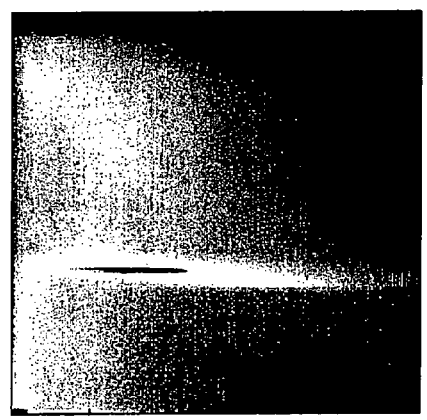

FIG. 3(*a*) shows the joint histogram of a CT-MR pair of images of the brain after registration. Thus each point in the histogram represents the number of pixels in the registered image with a given CT intensity and a given MR intensity. Good registration results in a histogram with a clear structure and few peaks. Poor registration results in more, scattered, peaks. The raw histogram in FIG. 3(*a*) is noisy, especially in the CT bone—MR soft tissue area. Direct estimation of p(i,j) from just this raw histogram (i.e. p(i,j)=h(i,j)) would result in limited robustness in the estimation of the registration transformation because small changes in the transformation cause large changes in the histogram and thus the similarity score. FIG. 3(*b*) shows a smoothed version of the histogram, using a simple uniform blurring technique, or simple Parzen windowing. It can be seen that the CT soft tissue—MR soft tissue area is smoothed, thus usefully reducing the sensitivity of the similarity measure to the transformation. But the distribution is inevitably less sharp and so such simplistic smoothing of the joint histogram can lose important properties of the distribution and bias the estimation of a correct p(i,j). This would result in less accurate registration of the two images (an inevitable result of reducing the sensitivity of the similarity score to the transformation). FIGS. 3(*c*) and (*d*) show p(i,j) estimated according to the invention with different values of $s_1$ and $s_2$. As can be seen the noise is cancelled out, but the properties of the distribution, such as the sharpness of the high peaks, are conserved. The preservation of the sharp peaks allows for accurate registration, while the reduction of noise increases robustness.

FIGS. 4(*a*) and (*b*) show example slices of an MR and CT image respectively, and FIG. 4(*c*) shows the result of fusing them using the technique of the invention. It can be seen that the skull structure lines up well in both CT (bright oval shape) and MR (between the brain and the scalp) images.

What is claimed is:

1. A method of finding a transformation which relates pixels in a first image to pixels in a second image, comprising: calculating for each of a plurality of candidate transformations a likelihood measure representing the likelihood that the candidate transformation correctly represents the relationship between the two images, the likelihood measure being based on local parametric joint and marginal probability density functions (pdf) calculated for the pairs of pixels in the two images which are regarded as corresponding under the candidate transformation, the parameters of the functions being set by maximizing a local likelihood criterion for the pairs of pixels, wherein the local parametric joint and marginal probability density functions are approximations in parametric form.

2. A method according to claim 1 wherein the local likelihood criterion for each probability density function is calculated based on the probability density function and at least one of a window function of the of the local data point characteristics and a scale parameter.

3. A method according to claim 2 wherein the window function and the scale parameter are heuristically adjusted.

4. A method according to claim 1 wherein the probability density functions are polynomial functions.

5. A method according to claim 4 wherein the probability density functions are second order polynomial functions.

6. A method according to claim 1 wherein the images represent signals or measurements.

7. A method according to claim 1 wherein the transformation is a spatial transformation that registers the images.

8. A method according to claim 7 wherein the images represent different modality images.

9. A method according to claim 7 wherein the images represent medical images.

10. A method according to claim 1 wherein the images are time-separated.

11. A computer program stored on a computer-readable medium comprising program code means for executing on a programmed computer system the method of claim 1.

12. A method according to claim 1 wherein the image is a three-dimensional image or a four-dimensional image.

13. A method according to claim 1 wherein the image is a four-dimensional image in which a three-dimensional image varies over time.

* * * * *